United States Patent [19]

Kogelschatz

[11] Patent Number: 5,013,959

[45] Date of Patent: May 7, 1991

[54] HIGH-POWER RADIATOR

[75] Inventor: Ulrich Kogelschatz, Hausen, Switzerland

[73] Assignee: Asea Brown Boveri Limited, Baden, Switzerland

[21] Appl. No.: 485,544

[22] Filed: Feb. 27, 1990

[30] Foreign Application Priority Data

Feb. 27, 1989 [CH] Switzerland .......................... 720/89

[51] Int. Cl.$^5$ ......................... H01J 7/24; H01J 61/04; H01J 65/04; H01S 3/097

[52] U.S. Cl. ...................................... 313/36; 313/607; 313/234; 313/635; 372/82; 372/88; 315/248

[58] Field of Search ............... 313/607, 622, 634, 635, 313/112, 35, 36, 42, 234; 372/88, 86, 87, 82; 315/248

[56] References Cited

U.S. PATENT DOCUMENTS

| | | | |
|---|---|---|---|
| 3,828,277 | 8/1974 | Otto et al. | 372/88 X |
| 4,038,577 | 7/1977 | Bode et al. | 313/188 |
| 4,837,484 | 6/1989 | Eliasson et al. | 313/607 X |

FOREIGN PATENT DOCUMENTS

| | | |
|---|---|---|
| 0254111 | 1/1988 | European Pat. Off. . |
| 2109228 | 5/1972 | France . |

*Primary Examiner*—Sandra L. O'Shea
*Attorney, Agent, or Firm*—Oblon, Spivak, McClelland, Maier, & Neustadt

[57] ABSTRACT

A high-power radiator, especially for ultraviolet light, wherein in order to increase the efficiency in the case of UV high-power cylindrical radiators, the inner dielectrics (3) are very small in comparison with the outer dielectric tube. A privileged direction of radiation is achieved by eccentric arrangement of the dielectrics and outer electrodes (2) only on the surface adjacent to the inner dielectric (3), and simultaneous construction of the outer electrode (7) as a reflector.

16 Claims, 3 Drawing Sheets

HIGH-POWER RADIATOR

| LIST OF DESIGNATIONS | |
|---|---|
| 1 | outer quartz tube |
| 2 | outer electrode |
| 3 | inner quartz tube |
| 4 | inner electrode |
| 5 | discharge space |
| 6 | alternating current source |
| 7 | coating |
| 8,8a | aluminum bodies |
| 9 | grooves in 8 |
| 10 | cooling bores |
| 11 | channels in 8 |
| 12 | treatment chamber |
| 13 | slots in 8 |
| 14 | leg at 8 |
| 15 | substrate |
| 16 | gap |

BACKGROUND OF THE INVENTION

1. Field of the Invention

The invention relates to a high-power radiator, especially for ultraviolet light, comprising a discharge space, which is filled with a fill-gas that emits radiation under discharge conditions, and of which the walls are formed by a first tubular dielectric and a second dielectric that is provided on its surfaces averted from the discharge space with first and second electrodes, and including an alternating current source connected to the first and second electrodes for feeding the discharge.

In this regard, the invention relates to the prior art such as follows, for example, from EP-A 054 111, from U.S. patent application 07/076,926 now U.S. Pat. No. 4,837,484 or also from EP patent application 88113393.3 dated 22 Aug. 1988 or U.S. patent application 07/260,869, dated 21 Oct. 1988, now U.S. Pat. No. 4,945,290.

2. Discussion of background

The industrial use of photochemical processes depends strongly upon the availability of suitable UV sources. The classical UV radiators deliver low to medium UV intensities at a few discrete wavelengths, such as, e.g. the low-pressure mercury lamp at 185 nm and especially at 254 nm. Really high UV powers are obtained only from high-pressure lamps (Xe, Hg), which then, however, distribute their radiation over a sizeable waveband. The new excimer lasers have made available a few new wavelengths for basic photochemical experiments, but for reasons of cost they are probably only suitable at present in exceptional cases for an industrial process.

In the EP patent application mentioned at the beginning, or also in the conference publication "Neue UV- und VUV Excimerstrahler" ("New UV and VUV Excimer Radiators") by U. Kogelschatz and B. Eliasson, distributed at the 10th Lecture Meeting of the Society of German Chemists, Specialist Group on Photochemistry, in Wurzburg (FRG) 18–20 Nov. 1987, there is a description of a new excimer radiator. This new type of radiator is based on the principle that excimer radiation can also be generated in silent electrical discharges, a type of discharge which is used on a large scale in ozone generation. In the current elements, which are present only briefly ($<1$ microsecond), of this discharge, rare gas atoms are excited by electron impact, and these react further to form excited molecular complexes (excimers). These excimers live only a few 100 nanoseconds, and upon decay give their bond energy off in the form of UV radiation.

The construction of such an excimer radiator corresponds as far as the power generation largely to a classical ozone generator, with the essential difference that at least one of the electrodes and/or dielectric layers delimiting the discharge space is impervious to the radiation generated.

The above-mentioned high-power radiators are distinguished by high efficiency and economic construction, and enable the creation of large-area radiators of great size, with the qualification that large-area flat radiators do require a large technical outlay. By contrast, with round radiators a not inconsiderable proportion of the radiation is not utilized due to the shadow effect of the internal electrodes.

SUMMARY OF THE INVENTION

Starting from the prior art, it is the object of the invention to create a high-power radiator, especially for UV or VUV radiation, which is distinguished in particular by high efficiency, is economic to manufacture, enables construction of large-area radiators of a very great size, and in which the shadow effect of the internal electrode(s) is reduced to a minimum.

In order to achieve this object with a high-power radiator of the generic type mentioned at the beginning, it is provided according to the invention that inside the first tubular dielectric a rod of dielectric material is arranged in the interior of which an electrical conductor that forms the second electrode is inserted or embedded.

Preferably, the external diameter of the rod, which preferably consists of quartz glass, is five to ten times smaller than the internal diameter of the outer tube.

In many cases, one would like to couple out the radiation preferably in one direction, e.g. in order to irradiate a surface. The ideal discharge geometry for this purpose is a flat radiator mirrored on the back (e.g. in accordance with EP-A-0254 111). The production of flat quartz cells is bound up with a large technical outlay and correspondingly high costs. It is possible to achieve a privileged direction of radiation in a simple way if discharge is distributed unevenly in the discharge gap, and this can be achieved most simply by an eccentric arrangement of the dielectric rod. In this way, it is achieved that the electric discharge takes place predominantly on the side on which the optical radiation is to be coupled out.

Instead of an outer electrode applied to the entire circumference of the outer dielectric tube, a partial vapour deposition or coating on the back suffices, the layer serving simultaneously as electrode and reflector. Aluminum that is provided with a suitable protective layer (anodized, $MgF_2$ coating) is recommended as a material which both can be effectively vapour-deposited and also has a high UV reflection.

It is easy to combine a plurality of such eccentric radiators into blocks which are suitable for the irradiation of large areas. The (semi-cylindrical) cutouts in the aluminum block serve simultaneously as support for the quartz discharge tubes, as (ground) electrode and as reflector. Any desired number of these discharge tubes can be connected in parallel by connecting the inner electrodes to a common alternating voltage source. For special applications, tubes with different gas filling and thus different (UV) wavelengths can be combined. The aluminum blocks described need not necessarily have plane surfaces. It is also possible to imagine cylindrical arrangements, in which the cutouts for receiving the discharge tubes are provided either outside or inside.

In the case of higher powers, it is possible to cool the aluminum blocks, e.g. by providing additional cooling channels. The individual gas discharge tubes can also additionally be cooled if, e.g. the inner electrode is constructed as a cooling channel.

In the UV treatment of surfaces and the curing of UV paints and varnishes, in certain cases it is advantageous not to work in air. There are at least two reasons that make a UV treatment with the exclusion of air appear indicated. The first reason is present when the radiation is of such shortwave length that it is absorbed by air and is thus attenuated (wavelengths less than 190 nm. This radiation leads to oxygen separation and thus to undesired ozone formation. The second reason is present when the intended photochemical effect of the UV radiation is impeded by the presence of oxygen (oxygen inhibition). This case happens, e.g., in the photocross-linking (UV polymerization, UV drying) of varnishes and paints. These operations are known in the art and are described, for example, in the book "U.V. and EB. Curing Formulation for Printing Ink, Coatings and Paints", published 1988 by SITA-Technology, 203 Gardiner House, Broomhill Road, London SW18, pages 89-91. In these cases, it is provided according to the invention to provide means for flushing the treatment chamber with an inert UV-transparent gas such as, e.g., nitrogen or argon. In particular in configurations in which the first electrode is made of a metal block provided with grooves, such flushing can be achieved without great technical expense, e.g., by additional channels fed by an inert gas source and open towards the discharge chamber. The inert gas conveyed by said channels can further be used to cool the radiator, so that in some applications separate cooling channels can be dispensed with.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
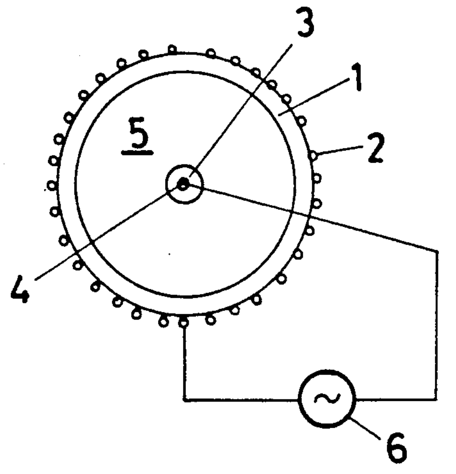
FIG. 1 shows a first illustrative embodiment of a cylindrical radiator with concentric arrangement of the inner dielectric rod, in cross-section.

Referring now to the drawings, wherein like reference numerals designate identical or corresponding parts throughout the several views, in FIG. 1 there is provided a quartz tube 1 with a wall thickness of approximately 0.5 to 1.5 mm and an external diameter of approximately 20 to 30 mm with an outer electrode 2 in the form of a wire gauze. Arranged concentrically in the quartz tube 1 is a second quartz tube 3 with a substantially smaller external diameter than the internal diameter of the quartz tube 1, typically 3 to 5 mm external diameter. A wire 4 is pushed into the inner quartz tube 3. The wire 4 forms the inner electrode of the radiator, and the wire gauze 2 forms the outer electrode of the radiator. The outer quartz tube 1 is sealed at both ends. The space between the two tubes 1 and 3, the discharge space 5, is filled with a gas/gas mixture emitting radiation under discharge conditions. The two poles of an alternating current source 6 are connected. The alternating current source basically corresponds to those such as are employed to feed ozone generators. Typically, it supplies an adjustable alternating voltage on the order of magnitude of several 100 volt to 20,000 volt with frequencies in the range of industrial alternating current up to a few 1000 kHz - depending upon the electrode geometry, pressure in the discharge space and the composition of the fill-gas.

The fill gas is, e.g. mercury, rare gas, rare gas-metal vapor mixture, rare gas/halogen mixture, as the case may be with the use of an additional further rare gas, preferably Ar, He, Ne, as buffer gas.

Depending upon the desired spectral composition of the radiation, a material/material mixture can be used in this process according to the following table:

| Fill-gas | Radiation |
|---|---|
| Helium | 60-100 nm |
| Neon | 80-90 nm |
| Argon | 107-165 nm |
| Argon + fluorine | 180-200 nm |
| Argon + chlorine | 165-190 nm |
| Argon + krypton + chlorine | 165-190, 200-240 nm |
| Xenon | 160-190 nm |
| Nitrogen | 337-415 nm |
| Krypton | 124, 140-160 nm |
| Krypton + fluorine | 240-255 nm |
| Krypton + chlorine | 200-240 nm |
| Mercury | 185, 254, 320-370, 390-420 nm |
| Selenium | 196, 204, 206 nm |
| Deuterium | 150-250 nm |
| Xenon + fluorine | 340-360 nm, 400-550 nm |
| Xenon + chlorine | 300-320 nm |

In addition, a whole series of further fill gases are candidates:

a rare gas (Ar, He, Kr, Ne, Xe) or Hg with a gas or vapor of $F_2$, $I_2$, $Br_2$, $Cl_2$ or a compound which, in the discharge, splits off one or a plurality of atoms F, I, Br or Cl;

a rare gas (Ar, He, Kr, Ne, Xe) or Hg with $O_2$ or a compound which, in the discharge, splits off one or a plurality of O atoms;

a rare gas (Ar, He, Kr, Ne, Xe) with Hg.

In the silent electrical discharge which forms, the electron energy distribution can be set optimally by the thickness of the dielectrics and their characteristics of pressure and/or temperature in the discharge space.

Upon the application of an alternating voltage between the electrodes 2, 4, a plurality of discharge channels (partial discharges) form in the discharge space 5. These interact with the atoms/molecules of the fill gas, and this finally leads to UV or VUV radiation.

Instead of quartz tubes 3 with inserted wire, it is also possible to employ quartz rods into which a metal wire has been sealed. Metal rods which are coated with a dielectric also lead to success.

Instead of a wire gauze 2, it is also possible to use a perforated metal foil or a UV transparent, electrically conductive coating.

If it is desired to achieve a privileged direction of radiation with simple means, the discharge is distributed unevenly in the discharge space. This can be done in the simplest fashion by eccentric arrangement of the inner dielectric tube 3 in the outer tube 1, as is illustrated, for example, in FIG. 2.

Figure 2:
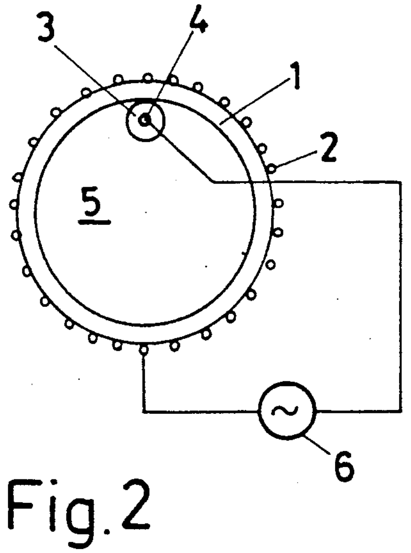
FIG. 2 shows a modification of the radiator according to FIG. 1, with an eccentric arrangement of the inner dielectric.

In FIG. 2, the inner quartz tube 3 is arranged outside the center near the inner wall of the tube 1. In the limiting case, the tube 3 can even bear against the tube 1, and be cemented there in a linear or punctiform fashion to the inner wall.

The eccentric arrangement of the inner quartz tube, and thus of the inner electrode 4, has no decisive effect upon the quality of the discharge. When the peak voltage has just been set only a narrow region in the immediate vicinity of the quartz tube 3 is excited. By increasing the voltage, it is possible to increase the discharge zone gradually until the entire discharge space 5 is filled with glowing plasma.

Figure 3:
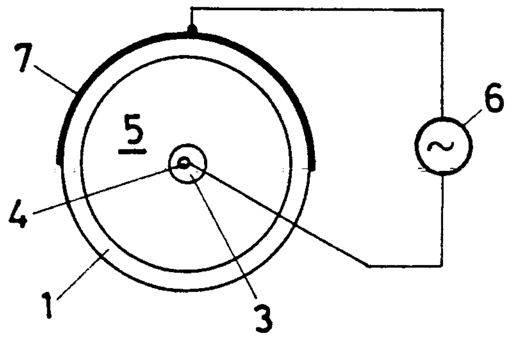
FIG. 3 shows an embodiment of a cylindrical radiator with concentric arrangement of the inner dielectric, and an outer electrode in the form of a coating, which extends over only a part of the circumference of the outer dielectric tube, the coating serving simultaneously as a reflector.

Instead of an electrode 2 applied to the entire external circumference of the outer dielectric tube 1 (FIG. 2), a partial coating of the outer surface of the tube 1 also suffices, as is illustrated in FIG. 3. The coating 7 extending over approximately half the external circumference of the tube 1 is simultaneously outer electrode and reflector. According to FIG. 2, an eccentric arrangement of the inner quartz tube 3 is also possible here, the coating 7 extending only symmetrically over the outer wall section facing the inner quartz tube 3. This layer 7 is simultaneously outer electrode and reflector. Aluminum is recommended as a material which both can be effectively vapour-deposited and also has a high UV reflection.

Figure 4:
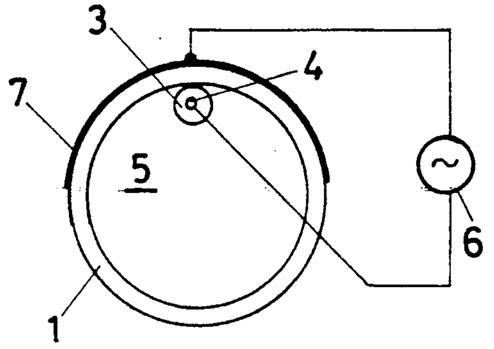
FIG. 4 shows an embodiment of a cylindrical radiator analogous to FIG. 3, but with eccentric arrangement of the inner dielectric and a coating, which extends only over a part of the circumference of the outer dielectric tube, which coating serves simultaneously as an outer electrode and as a reflector.
Figure 5:
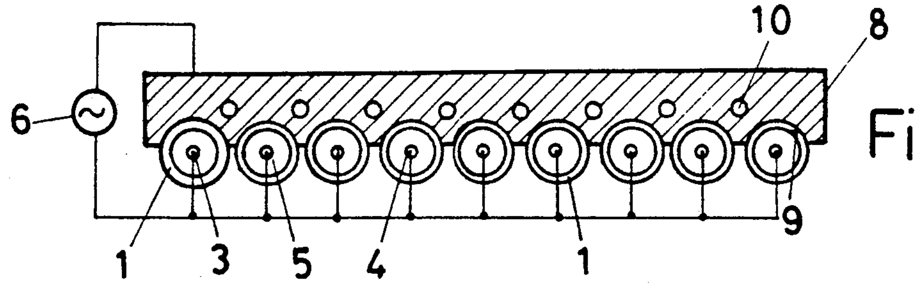
FIG. 5 shows the assembly of a plurality of radiators according to FIG. 3 to form a large-area radiator.
Figure 6:
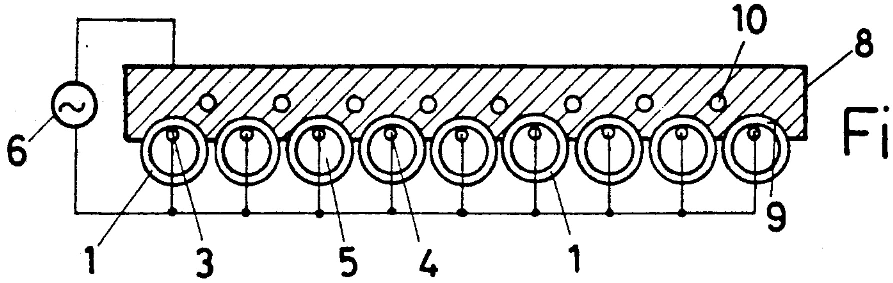
FIG. 6 shows the assembly of a plurality of radiators according to FIG. 4 to form a large-area radiator.

FIG. 5 illustrates the way in which it is possible to assemble a plurality of concentric radiators in accordance with FIG. 3 to form a large-area radiator. FIG. 6 shows a corresponding arrangement with eccentrically arranged inner quartz tubes 3 according to FIG. 4. To this end, an aluminum body 8 is provided with a plurality of parallel grooves 9 of circular cross-section, which are separated from one another by more than an external tube diameter. The grooves 9 are matched to the outer quartz tubes 1, and treated by polishing or the like in such a way that they reflect well. Additional bores 10, which run in the direction of the tubes 1, serve to cool the radiators.

The alternating current source 6 leads from one terminal to the aluminum body 8, the inner electrodes 4 of the radiators are connected in parallel and connected to the other terminal of the source 6.

In an analogous manner to the coatings 7 of FIG. 3 or FIG. 4, in the case of FIGS. 5 and 6 the groove walls serve both as outer electrode and also as reflectors.

For special applications, individual radiators with different gas fillings, and thus different (UV) wavelengths, can be combined.

Figure 7:
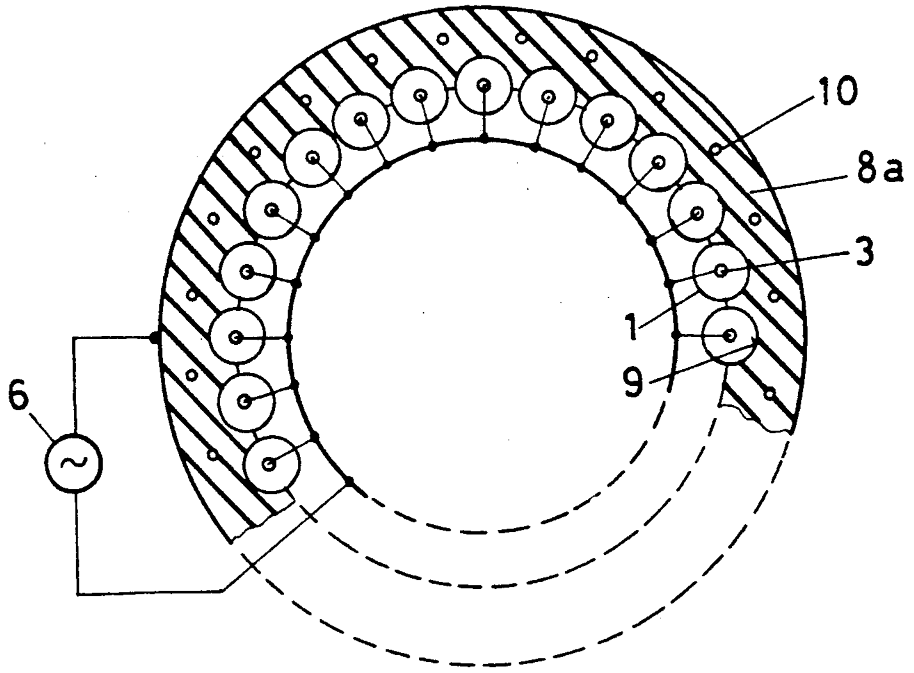
FIG. 7 shows a modification of FIG. 5 in the form of a large-area cylindrical radiator assembled from a multiplicity of radiators in accordance with FIG. 3.
Figure 8:
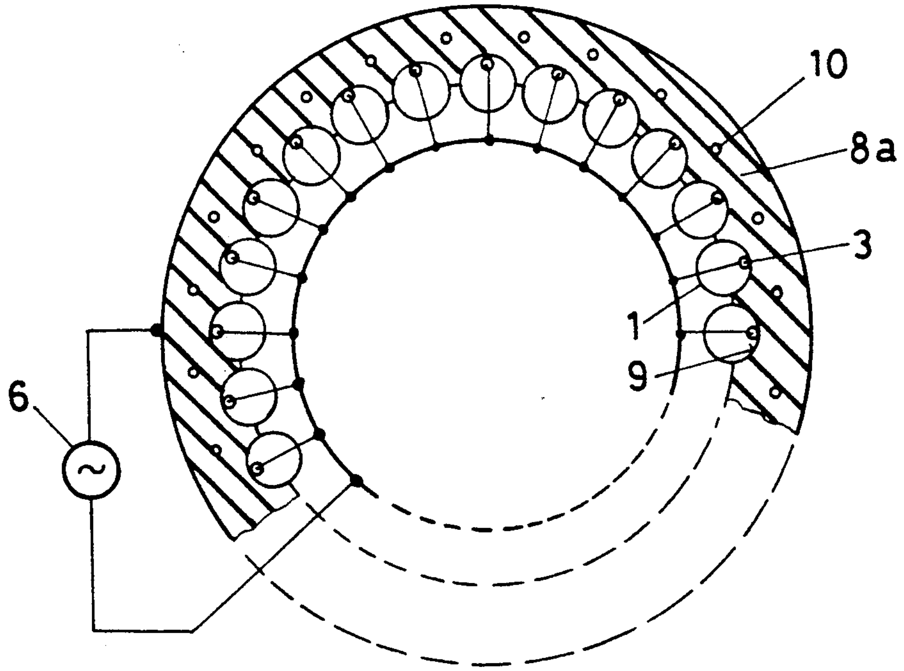
FIG. 8 shows a modification of FIG. 6 in the form of a large-area cylindrical radiator assembled from a multiplicity of radiators in accordance with FIG. 4.

The aluminum bodies 8 need not necessarily have plane surfaces. FIG. 7 and 8 illustrate, e.g. a variant with a hollow cylindrical aluminum body 8*a* with axially parallel grooves 9, which are distributed regularly over its inner circumference and in which a radiator element according to FIG. 3 or FIG. 4 is inserted in each case.

Figure 9:
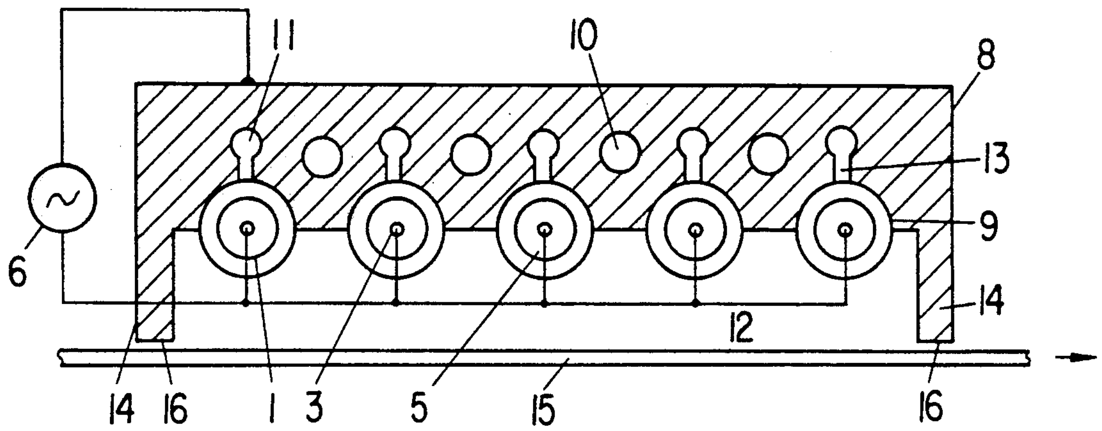
FIG. 9 shows a further development of the radiator according to FIG. 5 with means for feeding an inert gas into the treatment chamber.

The radiator according to FIG. 9 corresponds basically to the one according to FIG. 5 with additional channels 11 running in the lengthwise direction of metal block 8. These channels are connected to treatment chamber 12 by a multiplicity of boreholes or slots 13 in metal block 8, specifically connected by the relatively narrow gap, caused by unavoidable manufacturing tolerances of quartz tubes 1, between outer quartz tubes 1 and grooves 9 in metal body 8. Channels 11 are attached to an inert gas source not represented, e.g., a nitrogen or argon source. From channels 11, the inert gas under pressure reaches treatment chamber 12 in the way described. This treatment chamber is delimited, on the one hand, by leg 14 on metal body 8 and by substrate 15 to be irradiated. It is quickly filled with inert gas. Depending on the size of gap 16 between substrate 15 and the ends of leg 14, in doing so a certain amount of leakage gas supplied later by the inert gas source escapes. In this way, the interactions described above between the UV radiation generated in discharge chambers 5 and atmospheric oxygen are reliably avoided.

Figure 10:
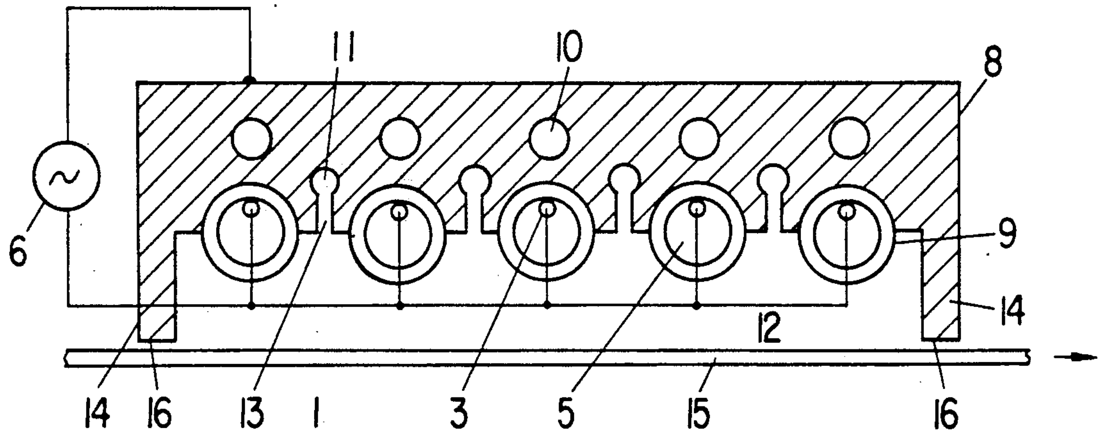
FIG. 10 shows a further development of the radiator according to FIG. 6 with means for feeding an inert gas into the treatment chamber.

In FIG. 10, another possibility for feeding inert gas to treatment chamber 12 is illustrated. The radiator here mostly corresponds to the one according to FIG. 6. But in addition, between adjacent quartz tubes 5, channels 11 are provided that run in the lengthwise direction of metal body 8 and that are connected directly by boreholes or slots 13 to treatment chamber 12. Otherwise, the design and operation correspond to the ones according to FIG. 9.

It is clear that the cylinder radiator according to FIGS. 7 and 8 can also be provided with means for feeding inert gas into the treatment chamber (there, the interior of tube 8*a*) without leaving the stated framework of the invention.

Obviously, numerous modifications and variations of the present invention are possible in the light of the above teachings. It is therefore to be understood that within the scope of the appended claims, the invention may be practised otherwise than specifically described herein.

What is claimed as new and desired to be secured by Letters Patent of the U.S. is:

1. A high-power radiator, especially for ultraviolet light, comprising a discharge space (5), which is filled with a fill-gas that emits radiation under discharge conditions, and of which the walls are formed by a first tubular dielectric (1) and a second dielectric (3) that is provided on its surfaces averted from the discharge space (5) with first (2, 7) and second electrodes (4), and comprising an alternating current source (6) connected to the first and second electrodes for feeding the discharge, wherein inside the first tubular dielectric (1) a rod (3) of dielectric material is arranged in the interior of which an electrical conductor (4) that forms the second electrode is inserted or embedded.

2. The high-power radiator as claimed in claim 1, wherein the external diameter of the rod (3) is five to ten times smaller than the internal diameter of the first tubular dielectric (1).

3. The high-power radiator as claimed in claim 1 or 2, wherein the rod (3) of dielectric material is arranged eccentrically in the first tubular dielectric (1).

4. The high-power radiator as claimed in claim 3, wherein the first electrode (7) covers the outer wall of the first dielectric (1) only in the section that is assigned to the second dielectric (3) and constructed as reflector.

5. The high-power radiator as claimed in claim 4, wherein the first electrode and the reflector are constructed as material recesses, preferably grooves (9), in a metal body (8).

6. A high-power radiator as claimed in claim 5, wherein cooling bores (10) that do not intercept the material recesses (9) are provided in the metal body (8).

7. The high-power radiator as claimed in claim 5, wherein the cross-section of the material recesses (9) is matched to the external diameter of the first dielectric (1), and the recess walls are constructed as UV reflectors.

8. High power radiator according to claim 5, wherein means (11, 13) are provided for feeding inert gas into a treatment chamber (12) outside said first tube-shaped dielectric (1).

9. High power radiator according to claim 6, wherein means (11, 13) are provided for feeding inert gas into a treatment chamber (12) outside said first tube-shaped dielectric (1).

10. High power radiator according to claim 7, wherein means (11, 13) are provided for feeding inert gas into a treatment chamber (12) outside said first tube-shaped dielectric (1).

11. High power radiator according to claim 8, wherein, in metal body (8, 8*a*), there are provided channels (11) connected directly or indirectly to treatment chamber (12) and through which an inert gas, preferably nitrogen or argon, can be fed.

12. High power radiator according to claim 9, wherein, in metal body (8, 8*a*), there are provided channels (11) connected directly or indirectly to treatment chamber (12) and through which an inert gas, preferably nitrogen or argon, can be fed.

13. High power radiator according to claim 10, wherein, in metal body (8, 8*a*), there are provided channels (11) connected directly or indirectly to treatment chamber (12) and through which an inert gas, preferably nitrogen or argon, can be fed.

14. High power radiator according to claim 11, wherein said channels (11) are each placed between adjacent tubular dielectrics (1) and are connected by boreholes or slots (13) to treatment chamber (12).

15. High power radiator according to claim 12, wherein said channels (11) are each placed between adjacent tubular dielectrics (1) and are connected by boreholes or slots (13) to treatment chamber (12).

16. High power radiator according to claim 13, wherein said channels (11) are each placed between adjacent tubular dielectrics (1) and are connected by boreholes or slots (13) to treatment chamber (12).

* * * * *